US005954322A

United States Patent [19]
Boria

[11] Patent Number: 5,954,322

[45] Date of Patent: Sep. 21, 1999

[54] ELEVATION FIXTURE FOR A MACHINE TOOL

[76] Inventor: Thomas J. Boria, P.O. Box 335, East Douglas, Mass. 01516

[21] Appl. No.: 08/895,212

[22] Filed: Jul. 16, 1997

[51] Int. Cl.[6] .......... B23Q 3/00

[52] U.S. Cl. .......... 269/296; 269/297; 269/303

[58] Field of Search .......... 269/296, 303, 269/304, 306, 315, 319, 99, 100, 101, 297, 299

[56] References Cited

U.S. PATENT DOCUMENTS

| | | | |
|---|---|---|---|
| 1,012,091 | 12/1911 | Markland . | |
| 1,419,752 | 6/1922 | Perrine | 269/297 |
| 2,472,083 | 6/1949 | Bartholdy | 269/297 |
| 2,495,275 | 1/1950 | Miller | 269/315 |
| 4,771,999 | 9/1988 | Takeuchi et al. . | |
| 4,789,279 | 12/1988 | Rottler et al. . | |
| 4,955,765 | 9/1990 | Laird . | |

*Primary Examiner*—Timothy V. Eley
*Assistant Examiner*—Benjamin M. Halpern
*Attorney, Agent, or Firm*—Blodgett & Blodgett, P.C.

[57] ABSTRACT

An elevation fixture for supporting a workpiece on the work supporting table of a machine tool. The fixture includes a pair of flanged support beams, each of which has a transverse groove at the bottom of the beam. The fixture also includes a key for each beam which fits into one of the inverted T-shaped keyways of the table and the transverse groove of the beam for locating the beam relative to the table. The fixture has a stop at one end for enabling a workpiece to be precisely positioned relative to the beams and to the table. Each beam has at least one upper horizontal flange for enabling the workpiece to be clamped to the beams. More specifically, each beam has at least one bottom horizontal flange which has a vertical slot. Each beam is secured to the work supporting table by a retaining nut which fits into the keyway of the work supporting table and a bolt which extend through the slot and is threaded into the retaining nut.

2 Claims, 4 Drawing Sheets

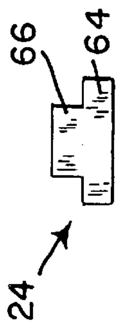
FIG. 11
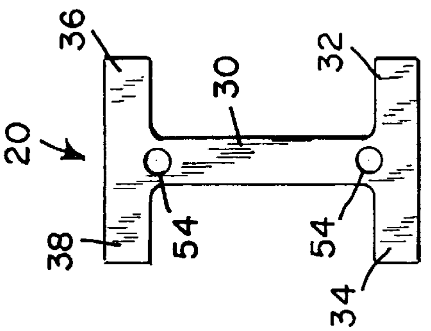
FIG. 8
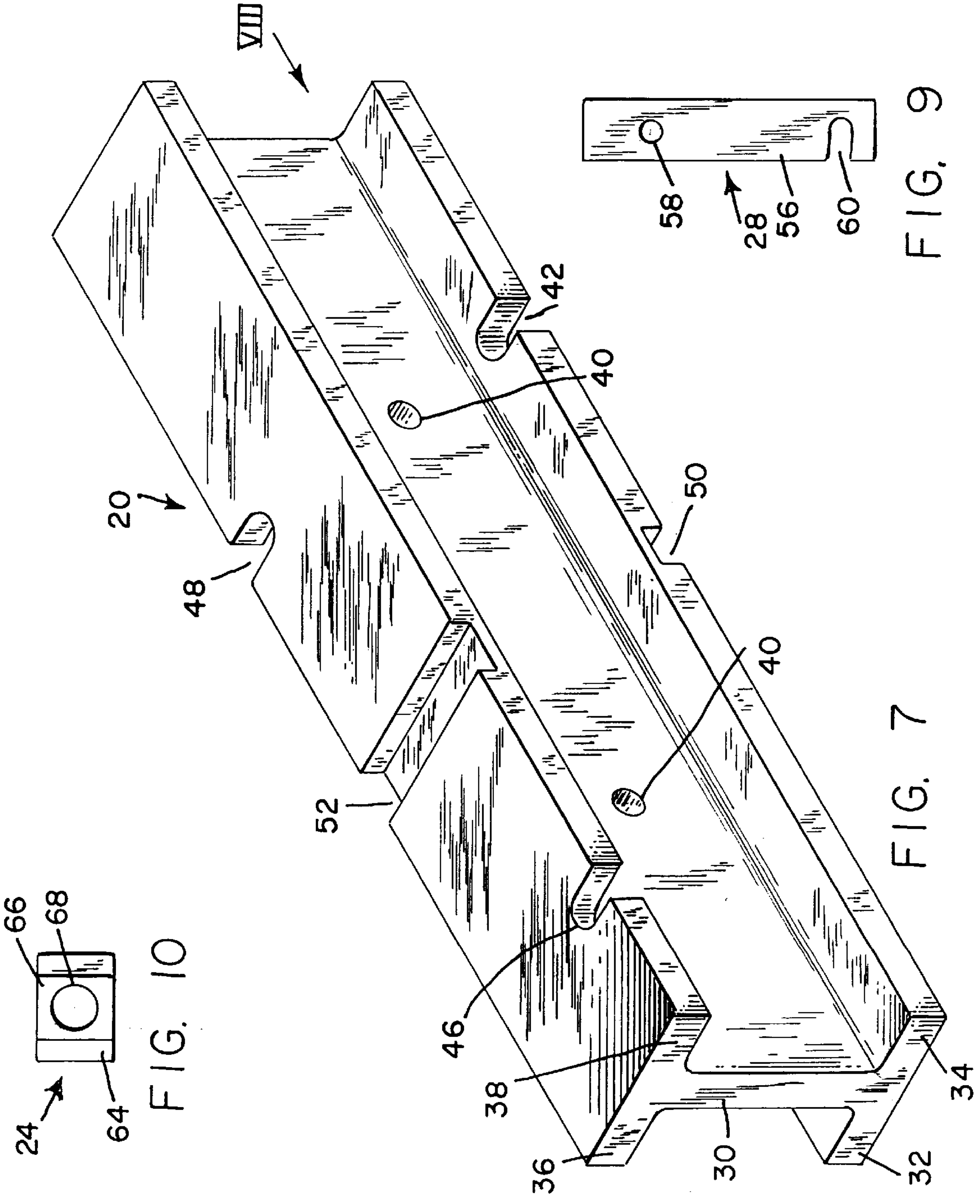
FIG. 7
FIG. 9
FIG. 10

ELEVATION FIXTURE FOR A MACHINE TOOL

CROSS-REFERENCE TO RELATED APPLICATIONS

Not Applicable

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed to a fixture for application to a conventional machine tool such as a drill press or milling machine which has a work supporting table and for supporting a workpiece above the table for the purpose of drilling a hole in the workpiece.

If a workpiece is clamped directly to the table of a machine tool for the purpose of drilling a hole in the workpiece, the table and drill will be damaged when the drill passes through the workpiece. It is also important that the workpiece be precisely located relative to the table to insure that a hole is drilled at precise point in the workpiece. In some cases, a workpiece may not have a flat surface. This would make it difficult to rest or position the workpiece accurately on the work supporting table.

Fixtures have been developed for use with table machine tools which clamp a workpiece to the work supporting table so that the workpiece is spaced from the table. The fixtures are relatively complex and cannot be located at a precise location relative to the table of a conventional table type machine tool.

A principal object of the present invention is the provision of a fixture for a conventional table type machine tool which enables a workpiece to be supported so that the workpiece is spaced from the upper surface of the work support table and the fixture and workpiece are located precisely relative to the workpiece.

Another object of the present invention is the provision of a fixture for a conventional table type machine tool having keyways in which the keyways are utilized by the fixture for locating the fixture relative to the table and for clamping the fixture to the table.

A further object of the present invention is the provision of a fixture for a conventional machine tool, equipped with a work supporting table, which enables a workpiece to be accurately and precisely located relative to the fixture and to the table.

BRIEF SUMMARY OF THE INVENTION

An elevation fixture for supporting a workpiece on the work supporting table of a machine tool. The fixture includes a pair of flanged support beams, each of which has a transverse groove at the bottom of the beam. The fixture also includes a key for each beam which fits into one of the inverted T-shaped keyways of the table and the transverse groove of the beam for locating the beam relative to the table. The fixture also has means for securing each beam to the table. The fixture has a stop at one end for enabling a workpiece to be precisely positioned relative to the beams and to the table. Each beam has at least one upper horizontal flange for enabling the workpiece to be clamped to the beams. More specifically, each beam has at least one bottom horizontal flange which has a vertical slot. The means for securing each beam to the table comprises retaining nut which fits into the keyway of the work supporting table and bolts which extend through the slot and is threaded into the retaining nut.

BRIEF DESCRIPTION OF THE DRAWINGS

The character of the invention, however, may be best understood by reference to one of its structural forms, as illustrated by the accompanying drawings, in which:

FIG. 7 is a isometric view of the support beam;

FIG. 8 is an elevational view of the support beam, looking in the direction of arrow VIII of FIG. 7;

FIG. 9 is an elevation view of the stop for application to the support beam;

FIG. 10 is a top plan of one of locking nuts which is used for clamping the support beams to the table of the machine tool; and FIG. 11 is side elevational view of the nut of FIG. 10.

DETAILED DESCRIPTION OF THE INVENTION

Figure 1:
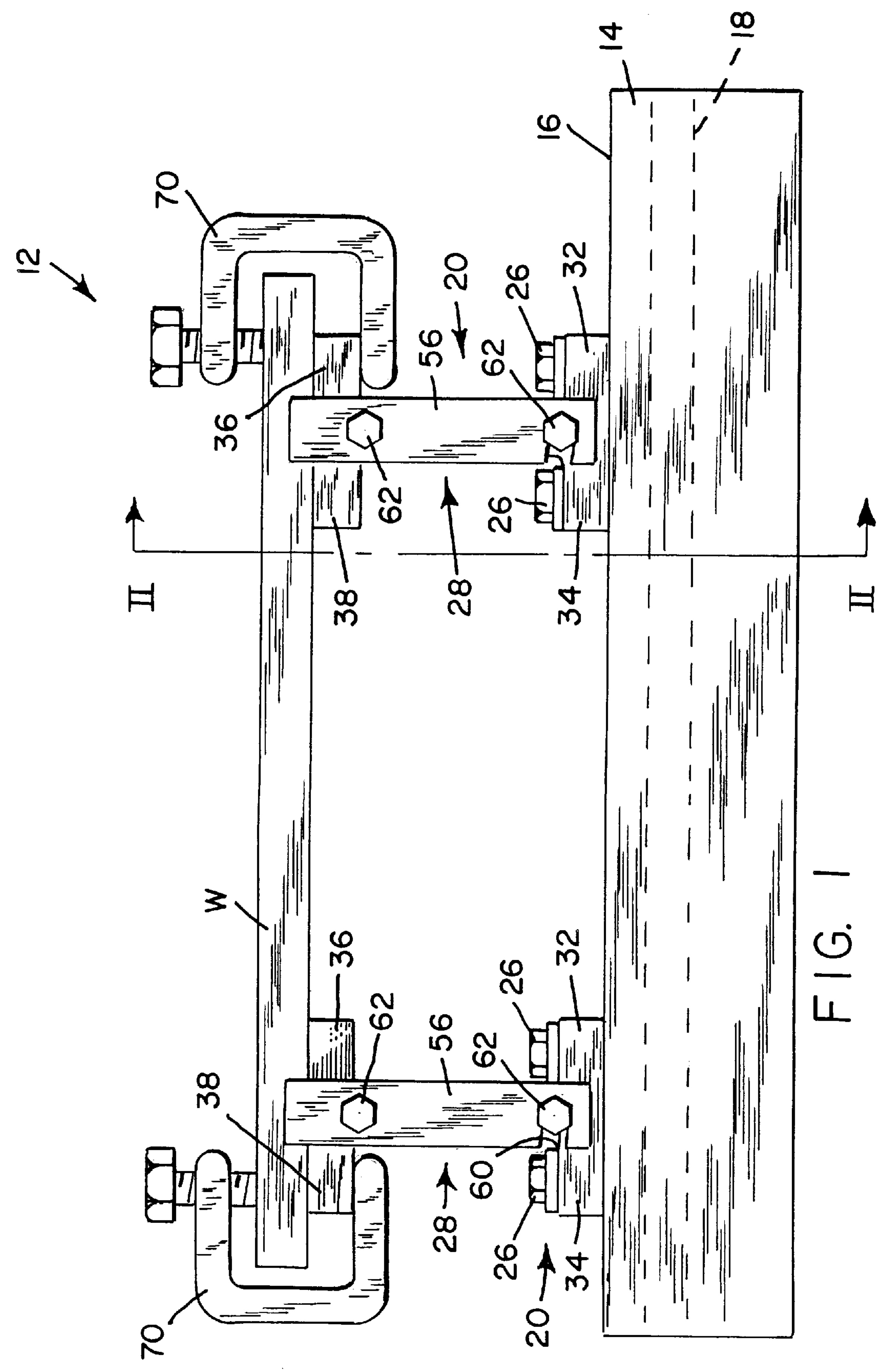
FIG. 1 is a front elevational view of a work holding fixture embodying the principles of the present invention, shown applied to the work supporting table of a conventional milling machine and supporting a workpiece.
Figure 2:
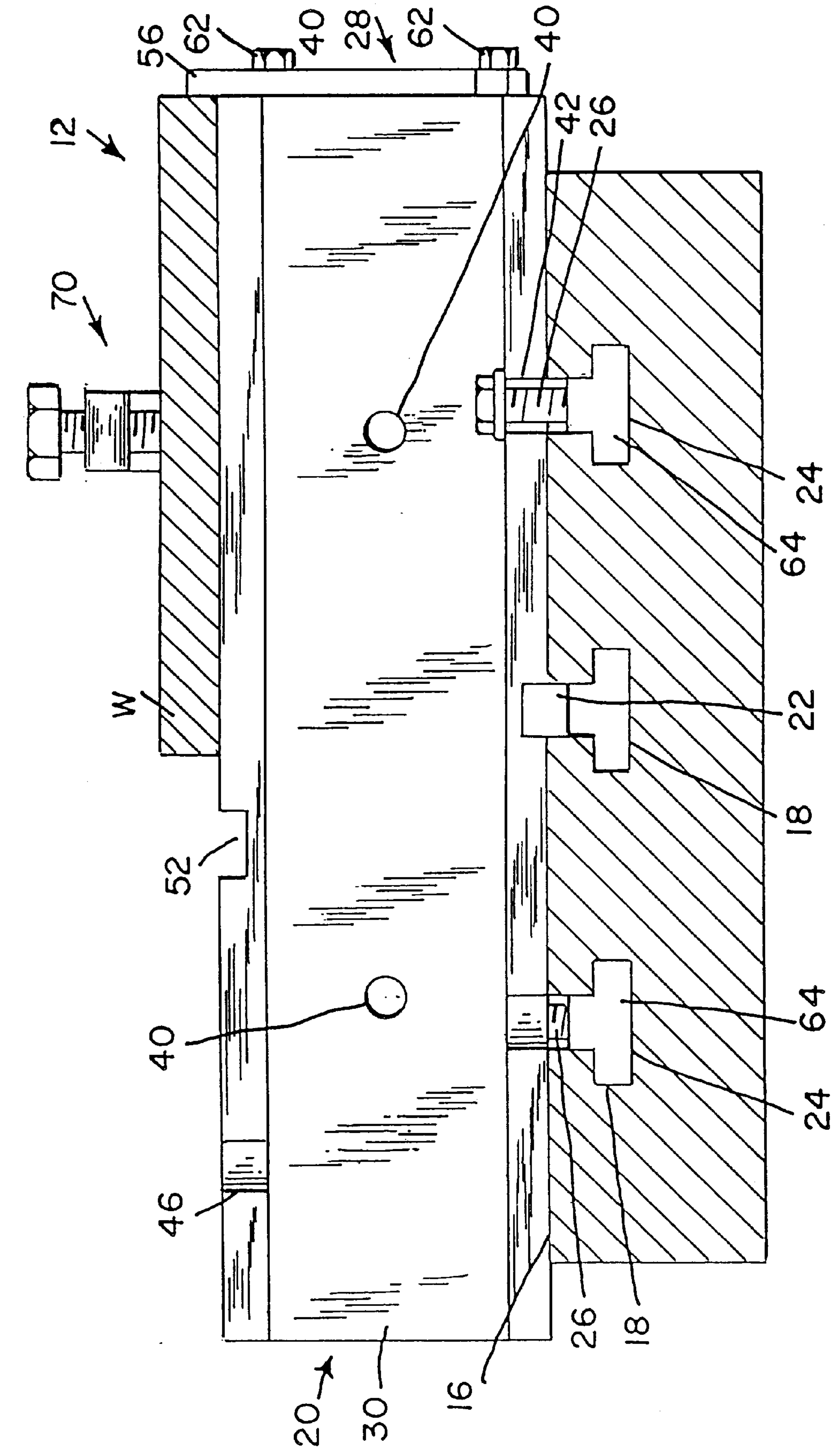
FIG. 2 is a vertical cross-sectional view taken along the line II—II of FIG. 1 and looking in the direction of the arrows.

Referring first to FIGS. 1 and 2, the elevation fixture of the present invention is generally indicated by the reference numeral 12 and is shown applied to the work supporting table 14 of a milling machine. The table 14 has a horizontal upwardly facing surface 16 and a plurality of inverted T-shaped horizontal keyways 18. The fixture 12 is supported on the top horizontal surface 16 of the table and, in turn, supports a workpiece W.

The elevation fixture 12 comprises a pair of I-beams, generally indicated by the reference numeral 20, a pair of rectangular keys 22, a plurality of retaining nuts, generally indicated by the reference numeral 24, bolts 26, and a pair of stops, generally indicated by the reference numeral 28.

Figures 3, 4, 5, 6:
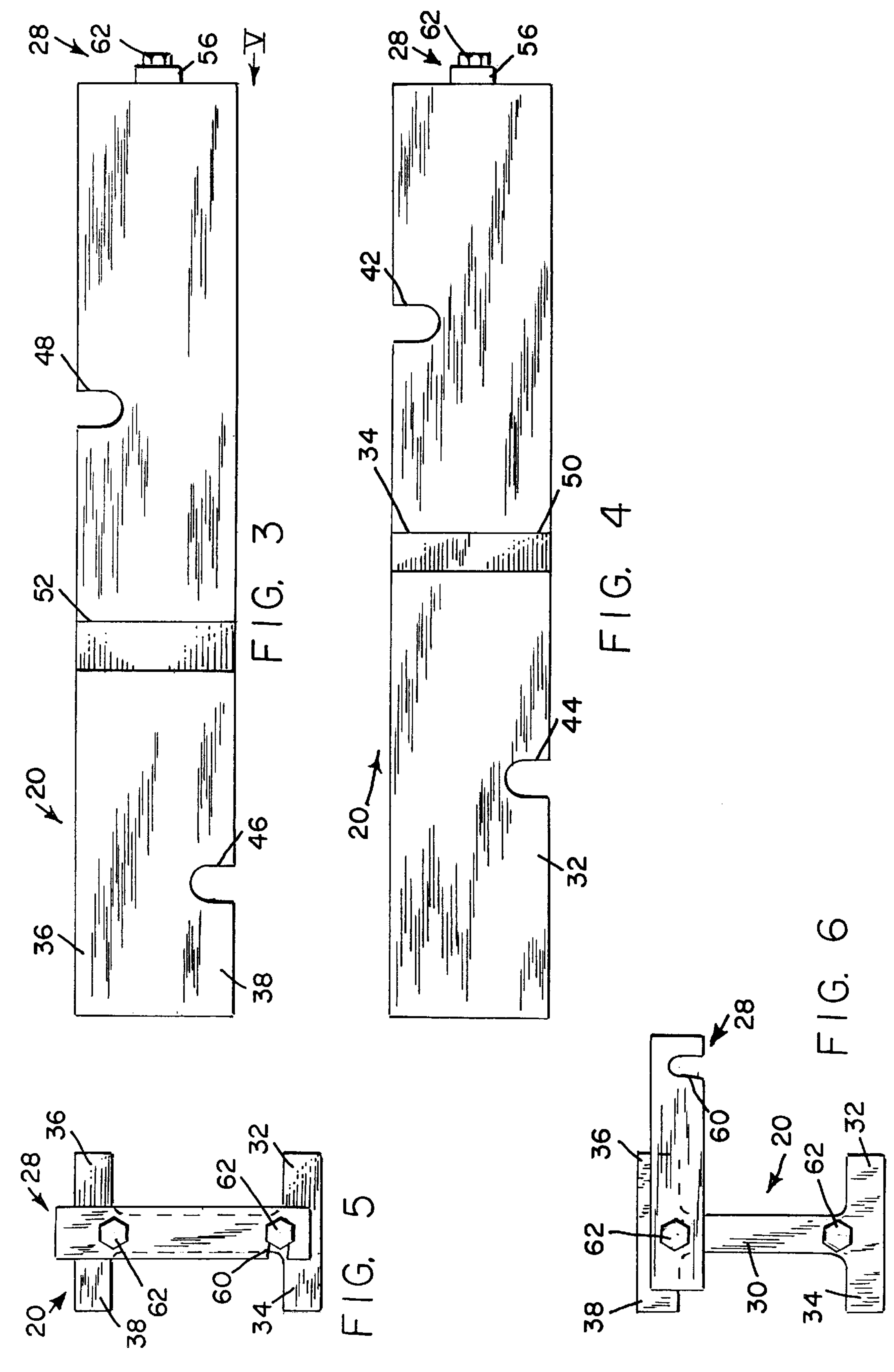
FIG. 3 is a top plan view of a support beam and stop which constitutes a subcombination of the fixture of the present invention.
FIG. 4 is a bottom plan view of the support beam of FIG. 3.
FIG. 5 is an end elevational view of the support beam, looking in the direction of the arrow V of FIG. 3 and showing the stop in an active or stopping position.
FIG. 6 is a view similar to FIG. 5 showing the stop in its inactive or nonstopping position.

Referring specifically to FIGS. 3, 4, and 7, each I-beam 20 consists of a vertical wall 30, first and second lower horizontal flanges 32 and 34, respectively, and first and second upper horizontal flanges 36 and 38, respectively. The vertical wall 30 has a pair of apertures 40. The flange 34 has a vertical opening or slot 42 at one end of the I-beam 20 and the flange 32 has a vertical opening or slot 44 at the opposite end of the I-beam. The flange 38 has a vertical opening or slot 46 and the flange 36 has vertical opening or slot 48. The bottom surface of the I-beam 20 has a transverse groove 50. The top surface of the I-beam 20 has a transverse groove 52 which has a larger width than the transverse groove 50. The width of groove 50 is equal to that of the upper portions of the keyways 18 of the most common milling machine. The width of the groove 52 is equivalent to the width of the upper portion of keyways 18 of the next most common milling machine or worktable of a drill press. This provides added versatility to the fixture. In cases where the fixture is used on the machine having grooves which are the same width as groove 52, the I-beams 20 are inverted so that the flanges 36 and 38 are the lower flanges of the I-beam and the flanges 32 and 34 are the upper flanges of the I-beam. One end of each I-beam 20 has a pair of threaded bores 54 for enabling one of the stops 28 to be applied to the end of the I-beam.

Referring particularly to FIGS. 5, 6, and 9, each stop 28 consists of a bar 56 which has an aperture 58 and a slot 60. The stop 28 is applied to the end of the I-beam 20 in a stopping position by aligning the aperture 58 and slot 60 with the bores 54 and threading a pair of bolts 62 into the bores 54. When the stop 28 is attached to the I-beam 20 in the stopping position, one end of the stop extends above the upper surface of the I-beam, as shown in FIG. 5. Stop 28 is moved to a nonstopping or neutral position by loosening the bolts 62 and rotating the stop about its aperture 58 so that the slot 60 swings away from the lower bolt 62 until the stop 28 extends horizontally, as shown in FIG. 6. When the stop 28 is in its nonstopping or neutral position it is entirely below the upper surface of the I-beam.

Referring specifically to FIGS. 2, 10, and 11, each retaining nut 24 has a head portion 64 and a shank portion 66. The nut 24 has a vertical threaded bore 68 for receiving the bolt 26.

Referring to FIGS. 1 and 2, the fixture 12 of the present invention is utilized for holding a workpiece W by positioning a pair of keys 22 in one of the keyways 18 and placing a pair of I-beams 20 on the surface 16 of the table 14 so that the I-beams extend transversely of the keyways 18 in a spaced parallel relationship as shown in FIG. 1. The prelocation of the keys 22 is such that the upper portion of each key 22 that extends above the upper surface 16 of the table enters the groove 50 of one of the I-beams as shown in FIG. 2. The spacing of the slots 42 and 44, relative to the groove 50, is equal to the spacing of the keyways 18 so when the key 22 is located within the groove 50, slots 42 and 44 are vertically aligned with keyways 18 on opposite sides of the key 22. The I-beams 20 are secured to the table 14 by threading the bolts 26 into the apertures 68 of the retaining nuts 24 which are positioned below the slots 42 and 44. Since the keyways 18 represent known fixed points on the table 14, the position of each I-beam 20, transversely of the table, is also precisely known due to the locating effect which is provided by the key 22. Since the position of the stop 28 relative to groove 50 is also known, positioning of the workpiece W against the stops 56 enables the location of the workpiece W, relative to the table 14, to be precisely determined. Once the workpiece W has been properly positioned on the I-beams 20, the workpiece can be clamped to one of the horizontal flanges of the each I-beam by any conventional clamping means, such as C-clamps 70. When the fixture 12 is not being used, the stops 28 remain attached to the beams 20. The bolts 26 are inserted into the apertures 40 and secured with the retaining nuts 24 to prevent the bolts and nuts from being misplaced.

What is claimed is:

1. An elevation fixture for supporting a workpiece so that the workpiece is spaced from the work supporting table of a machine tool, said work supporting table having a horizontal upwardly facing surface and a plurality of spaced parallel horizontal inverted T-shaped keyways extending downwardly from said upper horizontal surface, said elevation fixture comprising:

(a) an elongated support beam to be used in spaced conjunction with a second identical support beam for supporting a workpiece, said support beam having a longitudinal axis and comprising;
  (1) a vertical wall;
  (2) a top horizontal surface;
  (3) a bottom horizontal surface having a groove extending transversely of said longitudinal axis;
  (4) at least one lower horizontal flange extending laterally from one side of said vertical wall adjacent said bottom horizontal surface, said lower horizontal flange having an upper surface at least one opening which extends downwardly entirely through said lower horizontal flange; and
  (5) at least one upper horizontal flange extending laterally from one side of said vertical wall adjacent said top horizontal surface wherein said upper horizontal flange of said support beam has at least one opening which extends entirely through said upper horizontal flange and said top horizontal surface has a groove extending transversely of said longitudinal axis and differing in width from the groove in said bottom horizontal surface for enabling said supported beam to be inverted for use on the work supporting table of a machine tool having keyways which correspond in width to the groove in said top horizontal surface;

(b) a key for insertion into said groove and one of said keyways when said support beam is positioned on said work supporting table so that said lower horizontal flange rests on said upwardly facing surface, said support beam is locked against horizontal movement along its longitudinal axis and said support beam is located in a set position relative to said work supporting table; and (c) a retainer for insertion into one of said keyways and said opening for securing said lower horizontal flange to said work supporting table.

2. An elevation fixture for supporting a workpiece so that the workpiece is spaced from the work supporting table of a machine tool, said work supporting table having a horizontal upwardly facing surface and a plurality of spaced parallel horizontal inverted T-shaped keyways extending downwardly from said upper horizontal surface, said elevation fixture comprising:

(a) an elongated support beam to be used in spaced conjunction with a second identical support beam for supporting a workpiece, said support beam having a longitudinal axis and comprising;
  (1) a vertical wall having at least one aperture;
  (2) a top horizontal surface;
  (3) a bottom horizontal surface having a groove extending transversely of said longitudinal axis;
  (4) at least one lower horizontal flange extending laterally from one side of said vertical wall adjacent said bottom horizontal surface, said lower horizontal flange having an upper surface at least one opening which extends downwardly entirely through said lower horizontal flange; and
  (5) at least one upper horizontal flange adjacent said top horizontal surface;

(b) a key for insertion into said groove and one of said keyways when said support beam is positioned on said work supporting table so that said bottom horizontal surface rests on said upwardly facing surface, said support beam is locked against horizontal movement along its longitudinal axis and said support beam is located in a set position relative to said work supporting table; and (c) a retainer for insertion into one of said keyways and said opening for securing said lower horizontal flange to said work supporting table, said retainer comprising:

(1) a nut which has a threaded aperture and which is adapted to be inserted into the keyway of said work supporting table, said nut being slidable longitudinally of said keyway and restrained from movement transversely of said keyway; and (2) a bolt having a head portion for positioning above the upper surface of said lower horizontal flange and a threaded shank portion for extending through the opening in said lower horizontal flange for threading into the threaded aperture of said nut, the shank portion of said bolt being adapted to fit into the aperture in said vertical wall to enable said bolt and nut to be stored on said vertical wall when said elevation fixture is not being used for supporting a workpiece.

* * * * *